US005737699A

United States Patent [19]
Farrar et al.

[11] Patent Number: 5,737,699
[45] Date of Patent: Apr. 7, 1998

[54] ANTENNA STRUCTURE FOR USE IN A TIMEPIECE

[75] Inventors: Penny Farrar; Bjorn Kjelsberg, both of Bienne, Switzerland

[73] Assignee: Eta Fabriques d'Ebauches, Grenchen, Switzerland

[21] Appl. No.: 451,538

[22] Filed: May 26, 1995

[30] Foreign Application Priority Data

May 5, 1995 [EP] European Pat. Off. .............. 95106836

[51] Int. Cl.[6] .............................................. H04B 1/08

[52] U.S. Cl. ............................ 455/344; 455/351; 368/10; 368/281

[58] Field of Search ................................ 455/90, 66, 344, 455/351, 100, 575, 550, 128, 129; 343/718, 866, 867; 368/10, 47, 276, 278, 281; 340/825.44, 311.1

[56] References Cited

U.S. PATENT DOCUMENTS

| | | | |
|---|---|---|---|
| 4,884,252 | 11/1989 | Teodoridis et al. | 343/718 |
| 5,007,105 | 4/1991 | Kudoh et al. | 455/344 |
| 5,134,724 | 7/1992 | Gehring et al. | 455/351 |
| 5,303,421 | 4/1994 | Goldenberg | 455/351 |
| 5,331,608 | 7/1994 | Umemoto et al. | 368/10 |
| 5,367,502 | 11/1994 | Barroso et al. | 368/10 |

*Primary Examiner*—Nguyen Vo

[57] ABSTRACT

Timepiece adapted to be worn on the wrist, comprising a case (24,91,82) for housing, in addition to elements necessary for displaying the time of day, an antenna (60) comprising at least one coil winding and being capable of capturing an electromagnetic field bearing radio diffused messages, a microreceiver (71) capable of receiving and transforming messages captured by said antenna (60) into data perceptible to the wearer of the timepiece, and a non-conductive support structure (70) onto which the microreceiver (71) is at least partially mounted, the support structure (70) bearing conductive paths (63,64,65,66) to enable the connection of said antenna (60) to the microreceiver (70). The coil winding is composed of a plurality of segments (61,62) each being directly connected to the conductive paths (63,64,65,66) such that the antenna (60) is directly mounted to and supported by the support structure (70).

4 Claims, 7 Drawing Sheets

ANTENNA STRUCTURE FOR USE IN A TIMEPIECE

The present invention relates generally to timepieces including an antenna. In particular, the invention relates to timepieces including an antenna capable of capturing an electromagnetic field bearing radio diffused messages and a microreceiver for receiving messages captured by the antenna in order to transform such messages into data perceptible to the timepiece wearer.

Many timepieces exist which are equipped with an antenna and a microreceiver in order to capture radio diffused signals. If such a timepiece is in the form of a wristwatch, the antenna is generally located within the bracelet. However, locating the antenna in the bracelet of a watch gives rise to problems of providing connections between the microreceiver and the antenna which forms part of the bracelet, this latter being a movable element and generally hinged to the case by means of pins or lugs. The leadthrough of the antenna conductor gives rise to constructional problems with complicated means for connecting these two elements. At the leadthrough, for instance, the conductors are mechanically stressed and they are prone to break if means are not provided to avoid such breakage. These means are difficult to manufacture and complicate not only the assembly of the timepiece but also the changing of the bracelet, a bracelet moreover which must be specially built since it bears an antenna and which may not always be exchanged with a bracelet readily found on the market.

Attempts have been made to simplify the construction of such timepieces by housing both the antenna and the microreceiver within the case itself, thereby avoiding the mechanical stressing of the conductors which connect the antenna to the microreceiver. Swiss Patent No. 672 870, by the present applicant, describes in one embodiment a timepiece including an inductive antenna and a microreceiver entirely confined within the space bounded by the case. The longitudinal axis of the coil windings forming the antenna is arranged parallel to the longitudinal direction of the bracelet. In this embodiment, the windings each comprise two interconnected sections, one of which is formed by a metallisation layer deposited under the glass and the other of which is formed by a metallic wire sunk into the back cover of the case.

Swiss Patent No. 679 356, also by the present applicant, describes an alternative construction of this timepiece, in which the coil windings are wound around a second glass and an internal casing provided in the case. Grooves are provided in the second glass and in the internal casing to facilitate the placement of the windings. The connection between the RF module of the microreceiver and the antenna is effected by bringing the coil windings directly into contact the RF module and thereafter soldering them in place.

Whilst the above described arrangements have enabled a simplification of such timepieces, there nevertheless remains a need to further improve their assembly and general construction. In particular, there exists a need to simplify and improve the structure of the antenna, its connection to the microreceiver and its assembly and mounting in the timepiece.

In the above described arrangements, the placement of the antenna in the timepiece requires either the inclusion of several additional members for the mounting of the antenna, or requires that the antenna itself be formed on or in a various parts of the timepiece. Such arrangements clearly complicate the manufacture of such timepieces and require the precise and careful handling of the timepiece during assembly, and thus unnecessarily add to the cost of the assembled timepiece.

An object of the present invention is therefore to provide a timepiece of the type defined above which ameliorates or overcomes the disadvantages of timepieces.

Another object of the invention is to provide timepiece in which an antenna can be easily mounted.

A further object of the invention is to provide timepiece whose assembly and general construction is facilitated by the nature of the antenna mounted therein and by the manner in which the antenna is so mounted.

In accordance with the invention, these objects are achieved in a timepiece adapted to be worn on the wrist or like-member of the body, comprising a case for housing, in addition to the elements necessary to display the time of day, an antenna comprising at least one coil winding and being capable of capturing an electromagnetic field bearing radio diffused messages. The timepiece also comprises a microreceiver capable of receiving and transforming messages captured by said antenna into data perceptible to the wearer of the timepiece and non-conductive support structure onto which said microreceiver is at least partially mounted. The support structure bears conductive paths to enable the connection of the antenna to the microreceiver. Notably, the coil winding of the antenna is composed of one or more segments each of which are directly connected to the conductive paths such that the antenna is directly mounted to and supported by the support structure.

A timepiece having these characteristics has the advantages of being simple and inexpensive to manufacture. The antenna of such a timepiece is able to be manufactured independently of these other timepiece elements, such as the dial and the glass, and incorporated in the timepiece during final assembly in a convenient manner. Additional elements upon which to mount the antenna need not be included in such a timepiece. Accordingly, the complexity of the assembly process and the overall construction of the timepiece, as well as the associated cost of manufacture, is significantly reduced.

The following description refers in more detail to the various features of the present invention. In order to facilitate the understanding of the invention, reference is made in the description to the accompanying drawings where the timepiece of the invention is illustrated in several embodiments. It is to be understood, however, that the invention is not limited to the embodiments as illustrated in the drawings.

Figure 1:
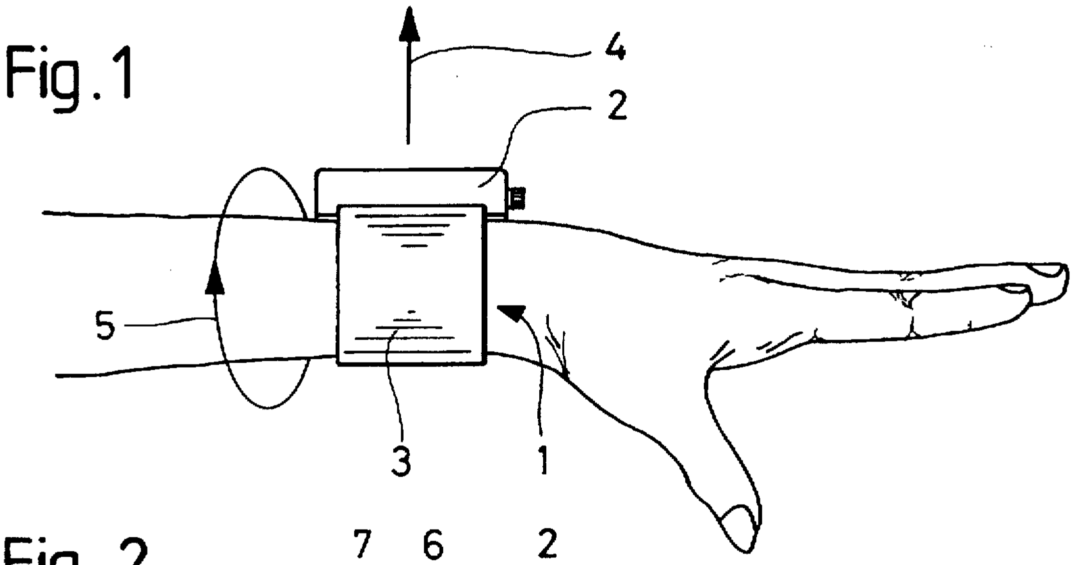
FIG. 1 is a schematic view of a timepiece according to the invention.

Referring now to FIG. 1 of the drawings, there is shown a forearm bearing a wristwatch 1 including a case 2 and a bracelet 3. Studies of electromagnetic electromagnetic fields have shown that its electrical and magnetic components are modified by the presence of the human body. The invention relates to a timepiece including an antenna capable of capturing such an electromagnetic field bearing radio diffused messages, these messages then being transformed into data perceptible to the timepiece wearer. Numerous measurements effected in the framework of this invention have indicated that the amplitude of these components is greatest (i) in the radial direction 4 i.e. in a direction perpendicular to the skin of the wearer of the wristwatch, and (ii) in the azimuthal direction 5 i.e. in a direction turning around or tangential to the body of the user.

Figure 2:
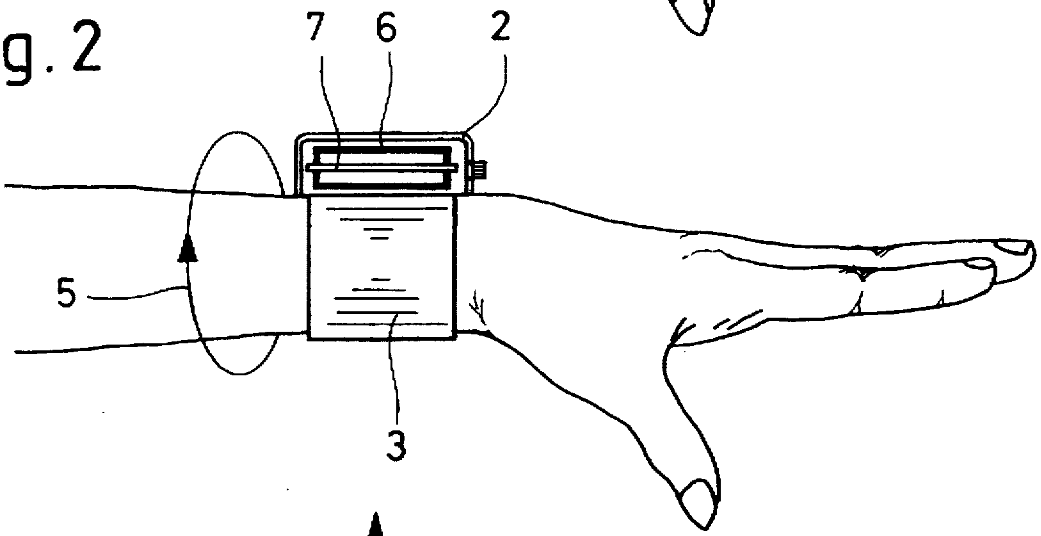
FIG. 2 is a schematic view of the timepiece of FIG. 1 and including a first embodiment of an antenna for capturing radio diffused messages.

From Maxwell's equations it can be adduced that the electrical component of an electromagnetic field may be captured by a capacitive antenna while the magnetic component of this field may be captured by an inductive antenna. FIG. 2 shows in a schematic manner how an inductive antenna capable of capturing the magnetic component of an electromagnetic field in the azimuthal direction 5 is arranged in the case 2 of the watch 1. The antenna 6 here comprises only a single coil winding which is connected to a microreceiver 7. In this instance, the axis of the coil is arranged parallel to the back cover of the case 2 and also parallel to the longitudinal direction of the bracelet 3.

Figure 3:
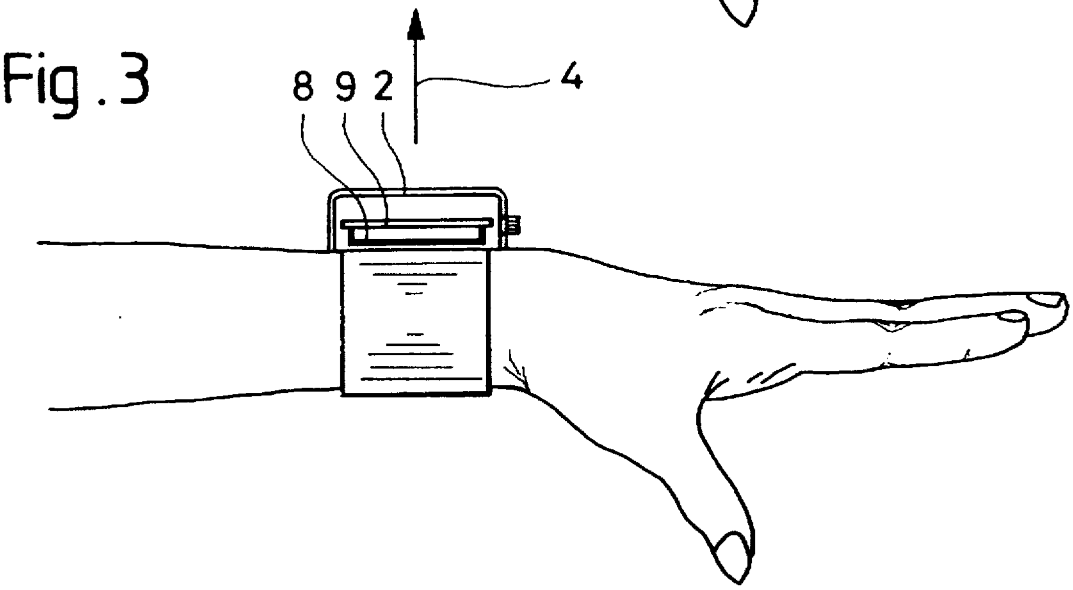
FIG. 3 is a schematic view of the timepiece according to FIG. 1 and including a second embodiment of an antenna for capturing radio diffused messages.

In contrast, FIG. 3 shows in a schematic manner how an inductive antenna capable of capturing the magnetic component of an electromagnetic field in the radial direction 4 is arranged in the case 2 of the watch 1. Once again, the antenna 8 here comprises only a single coil winding which is connected to a microreceiver 9. The axis of the coil is arranged perpendicular to the back cover of the case 2.

Figure 4:
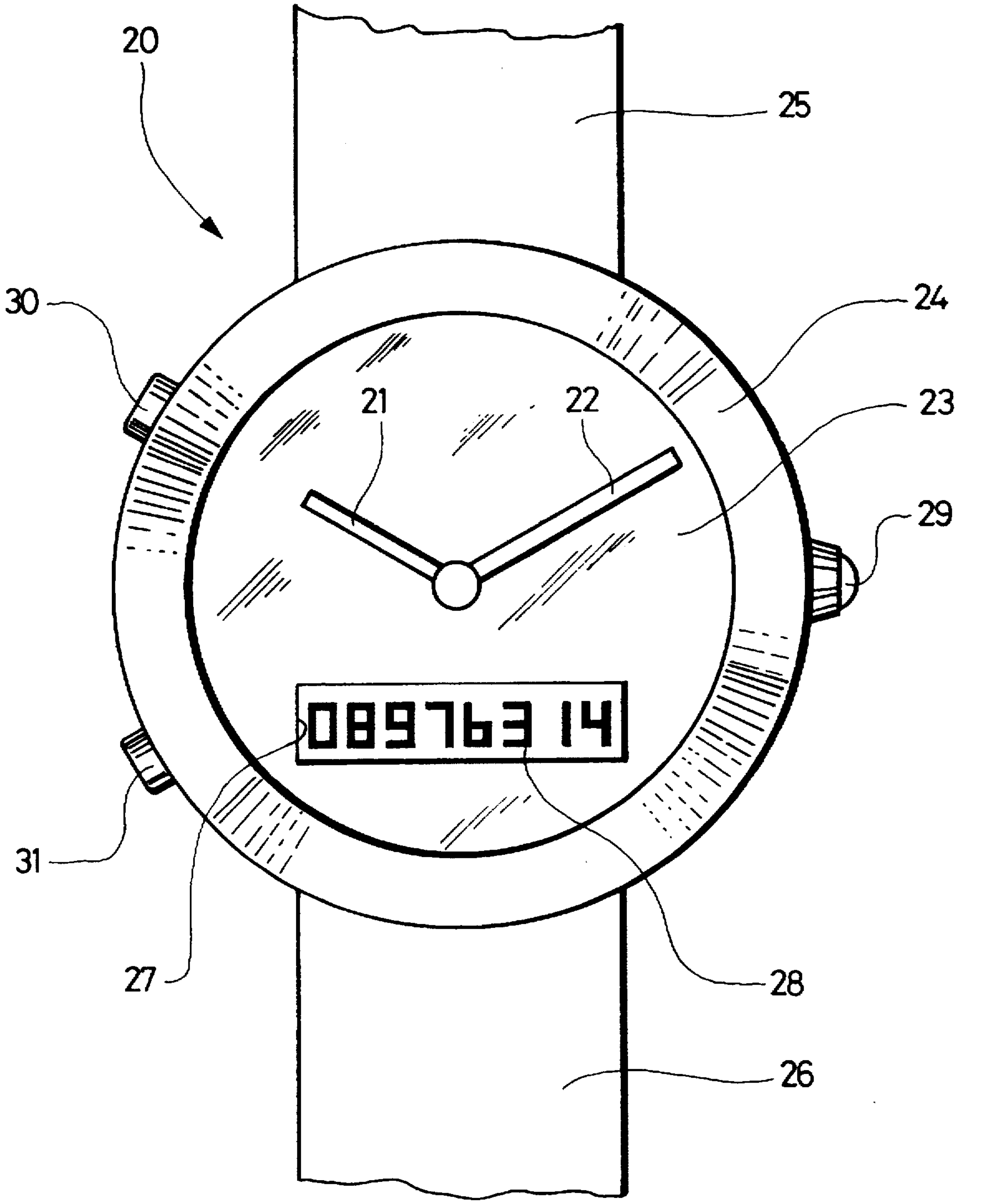
FIG. 4 is a plan view of the timepiece of FIG. 1.

FIG. 4 is a summary view of a timepiece 20 according to the present invention including the antenna 6 shown in FIG. 2. It includes analogue display means for the time of day with an hours hand 21 and a minutes hand 22, these hands rotating over a dial 23. On FIG. 11, there is seen the caseband 24 of the watch as well as the strands 25 and 26 of the bracelet attached thereto. In an opening 27 cut through the dial 23, there appears a display cell 28 for radio broadcast messages which assume a digital form and which may consist for instance of a telephone number to be called back. The watch is completed by a crown 29 for time setting the time display, by a first push-button 30 enabling the starting and stopping of the radio portion of the watch and by a second push-button 31 for preventing operation of an acoustic warning device mounted within the watch.

Figure 5:
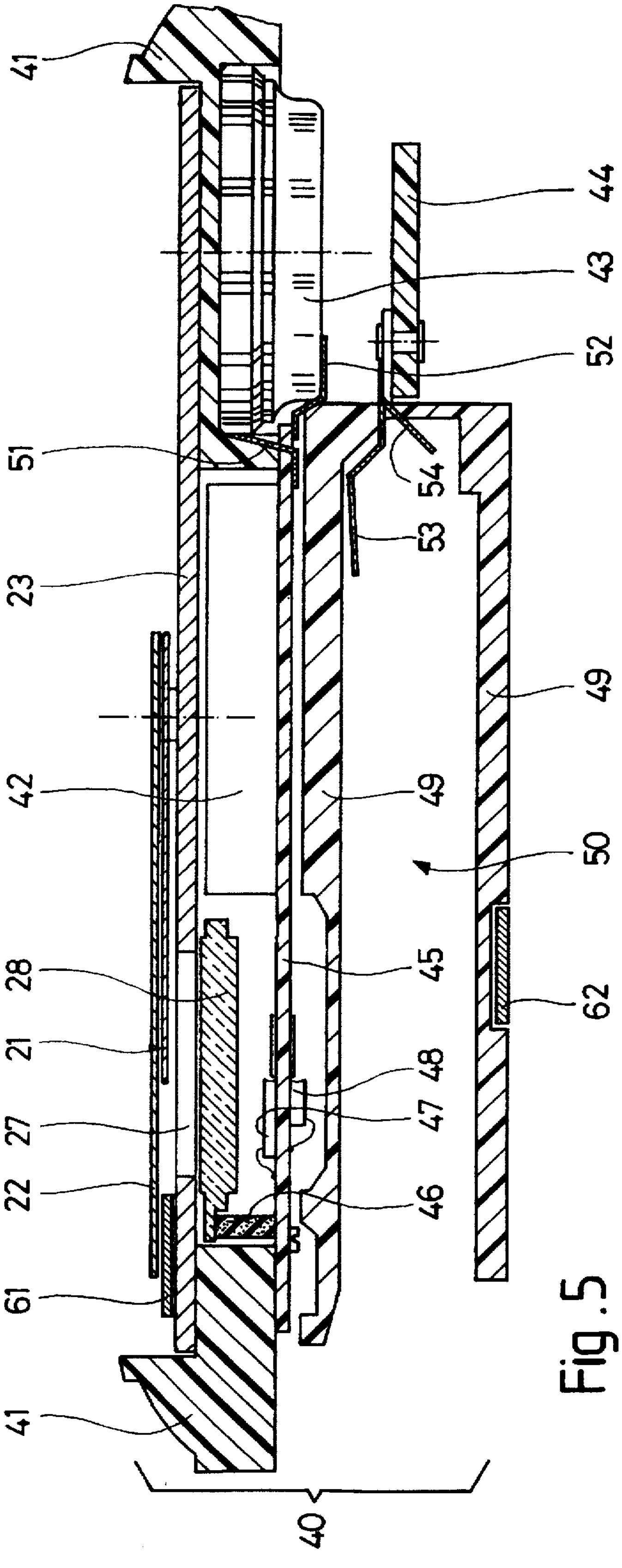
FIG. 5 is a cross-sectional view of the movement of the timepiece of FIG. 2.

Referring now to FIG. 5, there is shown a cross-sectional view taken in the watch 20 of FIG. 4. One sees that movement 40 comprises a baseplate 41 which serves to support various elements now to be described. To baseplate 41 is attached initially time display means which consist, in this embodiment, of a mechanism 42 driving the hours hand 21 and the minutes hand 22. Such mechanism may be itself driven in a known manner by a stepping motor (not shown). The time display means are controlled from a first energy source 43 consisting of a cell arranged in a housing in the baseplate 41. FIG. 5 shows that the baseplate 41 also bears a display cell 28 intended to cause radio broadcast messages to appear. The time display hands 21 and 22 rotate above dial 23, itself provided with an opening 27 allowing the user to read the indications displayed by the cell 28. Dial 23 is mounted on the baseplate 41.

Also attached to the baseplate 41, movement 40 further comprises electronic circuits in order to control the displays mentioned above. In the case of FIG. 5, such electronic circuits comprise two distinct modules, a first RF module 44 and a second digital module 45. The RF module receives the signals captured by the antenna mounted in the watch 20, as will be described hereinafter, amplifies such signal and then demodulates it. The digital module 45 receives the signal from the RF module 44 in order to control the display cell 28, for example through a zebra connector 46. One may find on such a digital module 45, in accordance with the functions with which it is desired to equip the watch, a decoder, a microprocessor and a RAM memory. In the example shown, the digital module 45 further bears electronic elements necessary in order to excite the stepping motor driving the mechanism 42, in particular a quartz, a frequency divider and a driver. Such various elements are symbolised by rectangles having the references 47 and 48.

Figure 8:
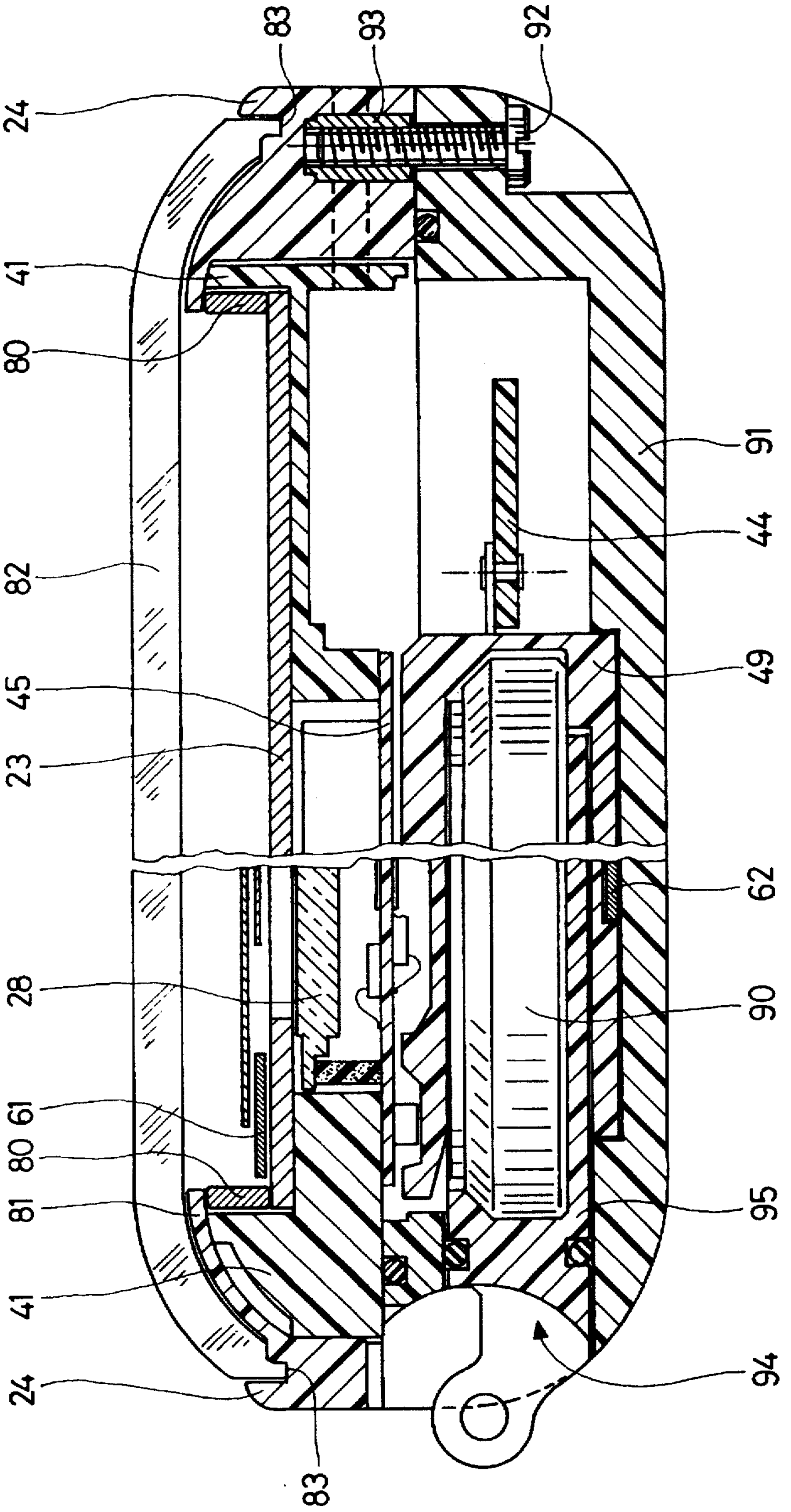
FIG. 8 is a cross-sectional view of the timepiece of FIG. 2 when assembled; and, FIG. 9 is a plan view of a second embodiment of the antenna of FIG. 6.

FIG. 5 also shows a casing 49 attached under the baseplate 41. Such casing acts to form a housing 50 for a second energy source or cell 90, as seen in FIG. 8, this latter figure showing a cross-sectional view of the timepiece 20 when completely assembled. The cell 90 intended to energise the time display mechanism is coupled electrically to the digital module 45 by connections 51 and 52. The cell 90, intended to energise the RF and digital modules is coupled to the RF module by connections 53 and 54.

In addition, FIG. 5 shows, in cross-section, coil winding segments 61 and 62 of an antenna 60 mounted in the watch 20. The upper segment 61 is directly mounted to and supported by the RF module 44. One end of this latter passes from the RF module 44, around the digital module 45, across the dial 23, back around the digital module 45 before connecting again at its other end to the RF module 44. The lower segment 61 is also directly mounted to and supported by the RF module 44. One end of this latter passes from the RF module 44 and around the exterior of the casing 49 before connecting again at its other end to the RF module 44.

Figure 6:
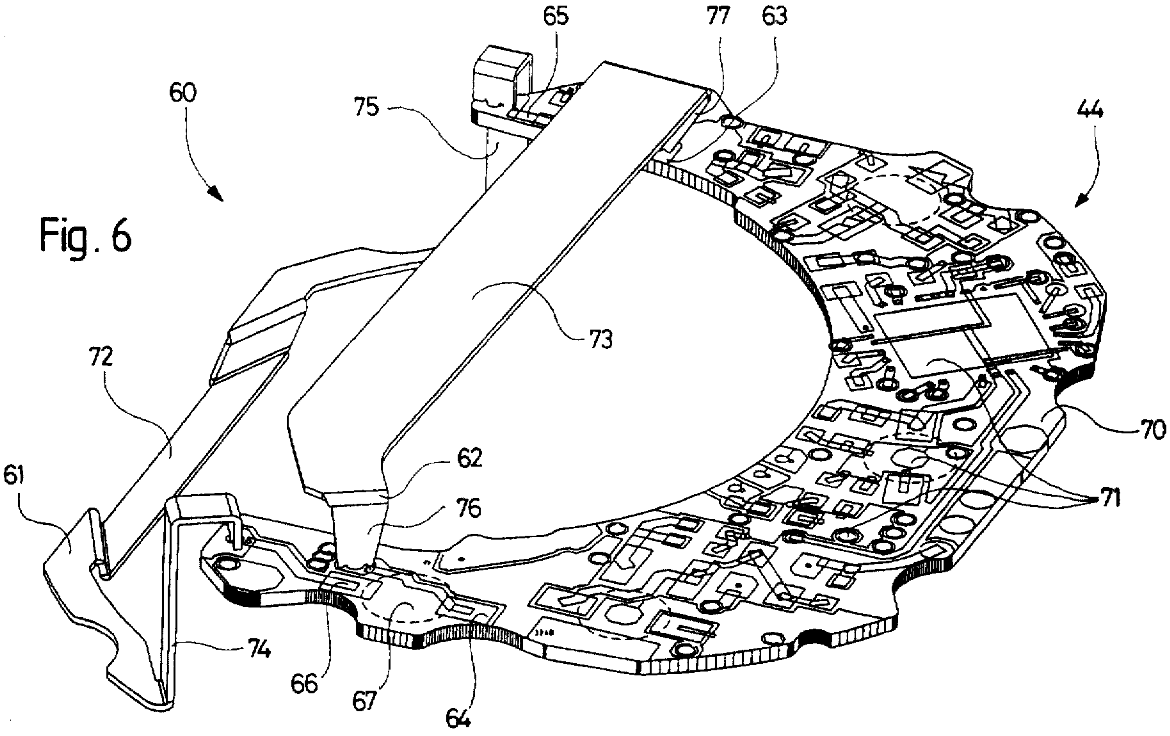
FIG. 6 is a perspective view of the antenna of the time piece of FIG. 2 and its mounting therein.
Figure 7:
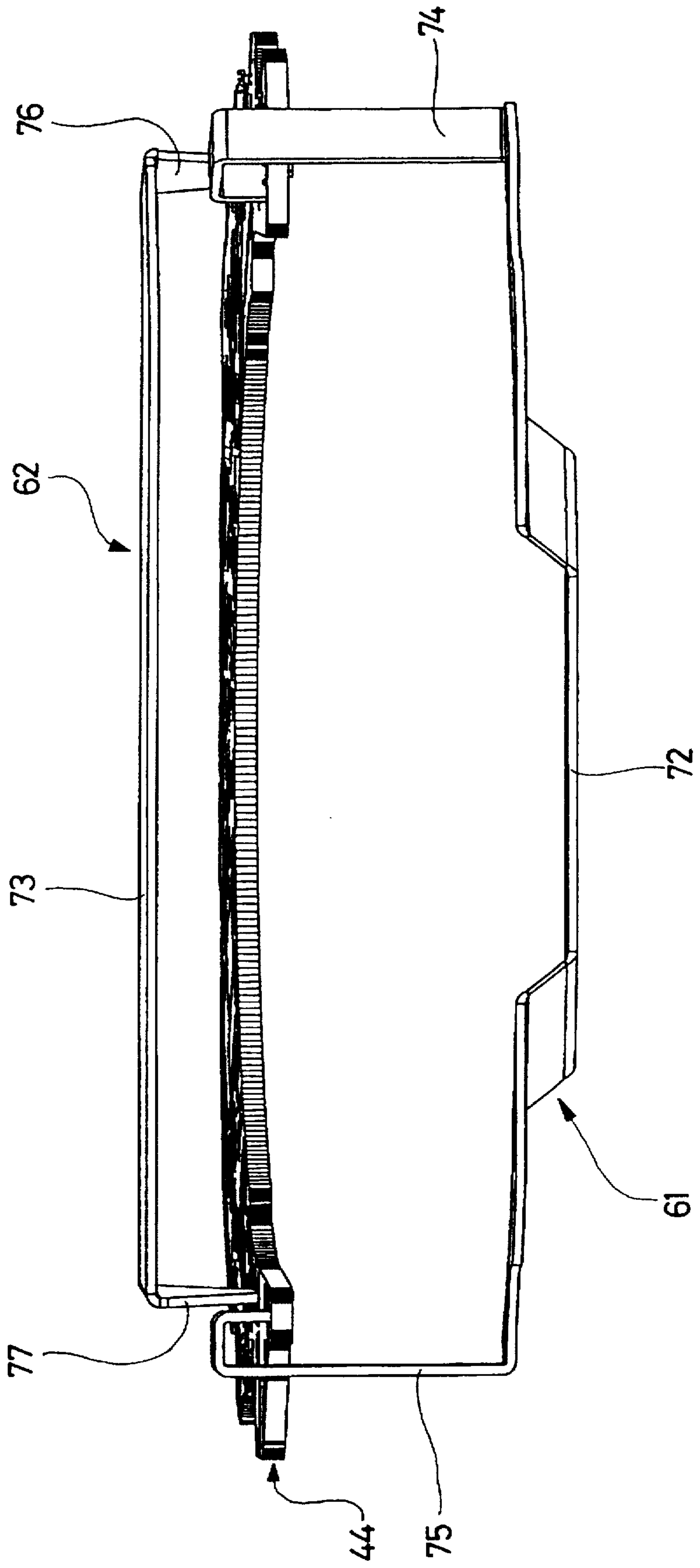
FIG. 7 is a side view of the antenna of FIG. 6.

FIGS. 6 and 7 show respectively a perspective view and a side view of the antenna 60 and the RF module 44 in more detail. The RF module 44 consists of a non-conductive support structure 70 onto which are fixed various electronic components, represented in FIG. 6 by the geometric FIGS. 71 shown on the upper surface of the support structure 70. The antenna 60, in this embodiment, comprises only one coil winding divided into two segments 61 and 62. The segments 61 and 62 are preferably made partially or completely from copper. Nevertheless, the skilled person will appreciate that other materials, such as silver, gold or like-conductors having appropriate electromagnetic properties, may be used in the construction of the antenna.

The winding segment 62 is connected between two conductive paths 63 and 64 deposited onto the support structure 70, whilst the winding segment 61 is connected between two conductive paths 65 and 66 also deposited onto the support structure 70. The conductive paths 63, 64, 65 and 66 enable the connection of the antenna 60 to the electronic components 71 of the RF module 44. The conductive paths 63 and 65 are respectively connected to the RF input and to the ground supply of the RF module 44. A capacitor 67, preferably having a variable capacitance, is connected between the conductive paths 64 and 66 in order to enable the tuning of the resonance frequency of the antenna 60.

As can be seen from this drawing, the winding segments 61 and 62 are directly mounted to and supported by the support structure 70, thus, firstly, avoiding the need to include additional members in the watch 20 which serve solely to support the antenna and, secondly, enabling the fabrication of the antenna elements independently of other time-keeping elements included in the watch 20. The segments 61 and 62 are preferably substantially rigid so as to be entirely self-supporting when mounted to the RF module 44. In this embodiment, the winding segment 61 comprises a beam 72 and two support members referenced 74 and 75 which support the beam 72 at a laterally displaced position from the RF module 44. Similarly, the winding segment 62 comprises a beam 73 and two support members referenced 76 and 77 which support the beam 73 at a laterally displaced position from the RF module 44. Whilst this arrangement is particularly suitable for inclusion in a watch, it will be appreciated that other forms of winding segments may nevertheless be envisaged by the skilled person.

Conveniently, the coil winding segments 72 and 73 are made from a strip of copper or other conductive material and then simply formed into the shapes shown in FIG. 6 according to known techniques of fabrication.

Referring now to FIG. 8, once the support members 74, 75, 76 and 77 of the coil winding segments 61 and 62 have been soldered in place on the support structure 70, the movement 40 shown in FIG. 5 is then assembled to the caseband 24 by means of two fastening screws (not shown). During this operation, a flange 80 is introduced between the dial 45 and a bezel 81 in order to maintain the dial 45 in place. In this embodiment, the bezel 81, that is the member of the timepiece which supports the glass 82, is unitary with the caseband 24.

Thereafter, the glass 82 is placed on the bezel 81 of the caseband 24. In its assembled position, the glass 82 engages a peripheral groove 83 provided in the caseband 24. The glass 82 and the caseband 24 may then be secured to each other by the application of ultrasonic energy, this assuring a sealed connection between these two elements.

As soon as the movement 40 is secured to the caseband 24, the assembly of the timepiece is completed by fastening thereto the back cover 91. In this embodiment, the back cover 91 is fastened to the caseband 24 by means of six screws 92, a single one of which only is shown in FIG. 8. Each screw is screwed into a threaded insert 93 forced into the caseband 24.

FIG. 8 also shows that an opening 94 is provided laterally in the back cover 91, such opening providing access to the second energy source or cell 90, this latter being housed in a drawer 95 sliding in the housing 50 defined by the casing 49 and the back cover 91, in order to permit replacement thereof.

The antenna 60 described hereinabove is capable of capturing the magnetic component of an electromagnetic field in the azimuthal direction 5 of FIGS. 1 and 2. As can be seen from FIG. 6, the coil winding segment 61 projects from the support structure 70 substantially in a first direction, whilst the coil winding segment 62 projects from the support structure 70 is substantially an opposing direction.

Figure 9:
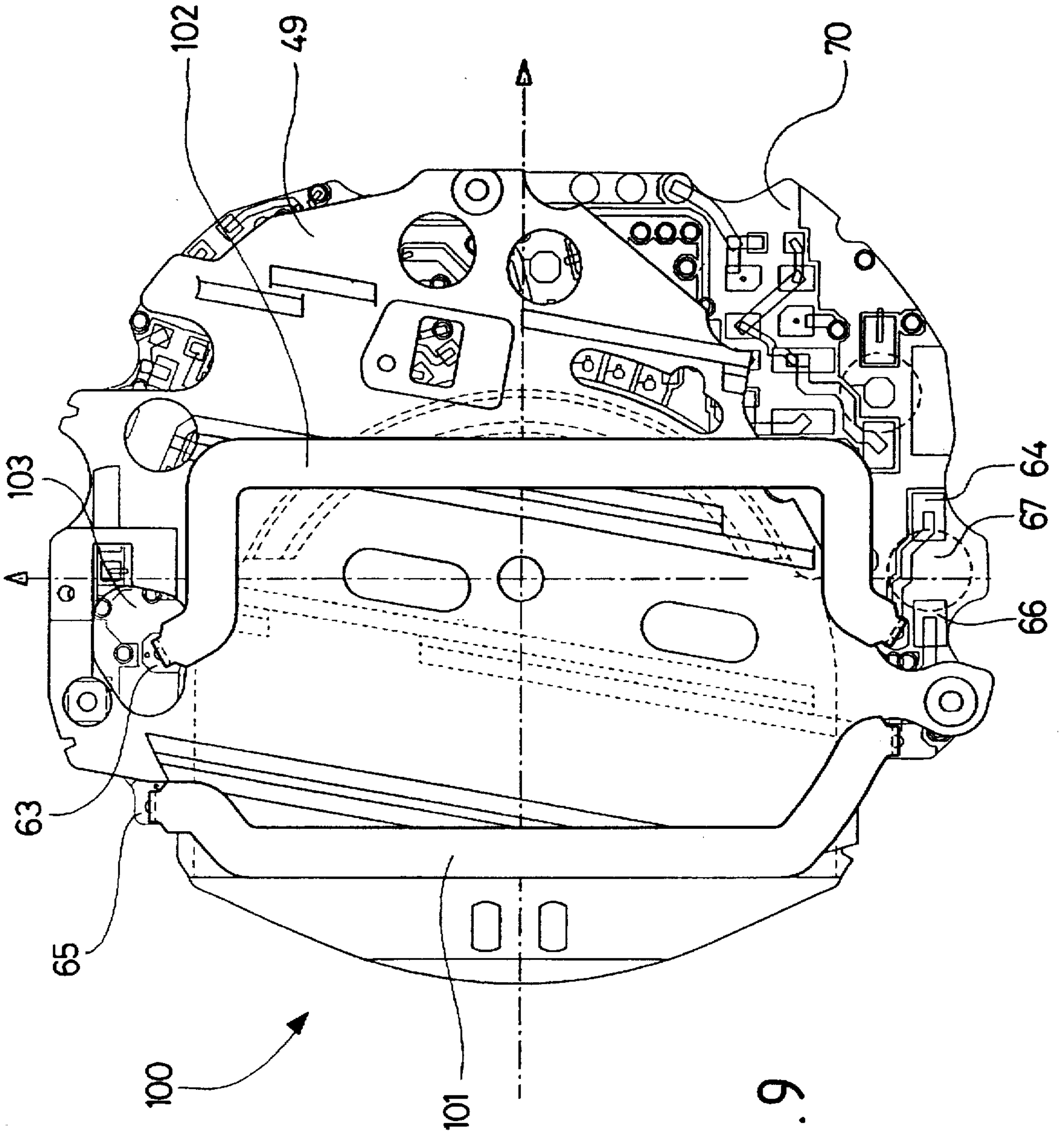

By contrast, FIG. 9 shows an embodiment of an antenna capable of capturing the magnetic component of an electromagnetic field in the radial direction 4 of FIGS. 1 and 2. FIG. 9 shows an antenna 100 comprising one coil winding divided into two segments 101 and 102. The axis of the coil thus formed is perpendicular to the back cover 91 of the timepiece 20. The winding segment 102 is connected between the conductive paths 63 and 64 on the support structure 70, whilst the winding segment 101 is connected between the conductive paths 65 and 66 on the support structure 70. As explained previously, the conductive paths 63, 64, 65 and 66 enable the connection of the antenna 60 to the electronic components 71 of the RF module 44. Once again, a capacitor 67, preferably having a variable capacitance, is connected between the conductive paths 64 and 66 in order to enable the tuning of the resonance frequency of the antenna 100.

As can be seen from this drawing, the winding segments 101 and 102 are directly mounted to and supported by the support structure 70, both coil winding segments projecting from this support structure in substantially the same direction. Openings, such as that referenced 103, may be formed in the housing 49 to facilitate such mounting. In this embodiment, the coil winding segments 101 and 102 may be mounted to the support structure 70 immediately prior to the fixing of the back cover 91 to the caseband 24.

The embodiments of timepiece which have just been described are intended to be worn on the wrist such that the antenna mounted therein captures the magnetic component of an electromagnetic field bearing radio diffused messages for receipt and transformation by the microreceiver into data perceptible to a user of the timepiece. According to Maxwell's equations, the electrical and magnetic components of an electromagnetic field are orthogonal to each other. Consequently, the electrical component of the field may be captured by a capacitive antenna while the magnetic component may be captured by an inductive antenna, this latter being realised by a coil having one or more windings.

The antennas 60 and 100 are intended to capture the magnetic field respectively in the azimuthal and radial directions. Accordingly, these antennas are inductive and the longitudinal axis of the coil winding forming them is arranged respectively parallel to and perpendicular to the longitudinal direction of the bracelet. It will be appreciated by the skilled person that although the antennas 60 and 100 have only one winding each, the actual number of windings constituting the antennas included in the timepiece of the present invention will depend on the oscillating frequency of the alternating electromagnetic field to be captured. In general terms, fewer coil windings are required to capture a field as the oscillating frequency of that field increases.

Finally, it is to be understood that various modifications and/or additions may be made to the timepiece of the invention without departing from the ambit of the present invention as defined in the claims appended hereto.

In that regard, whilst each of the above described embodiments of the timepiece includes an inductive antenna, the invention may also be applied in the case of capacitive antennas. For example, one or both plates of the capacitive antenna as shown in FIG. 8 of Swiss Patent No. 672 870 could be mounted to and supported by the support structure of the RF module, thus simplifying its mounting into a timepiece.

Moreover, it will be understood that whilst the timepiece illustrated in FIGS. 11 to 16 relates to a wristwatch including a paging device, the invention also applies to other timepieces and notably to radio-synchronised timepieces i.e. wristwatches and clocks which incorporate antennas and microreceivers for capturing radio diffused messages, these messages being used to set the correct time-of-day of the timepiece at regular intervals.

We claim:

1. Timepiece adapted to be worn on the wrist or likemember of the body, comprising:

a case (24,91,82) for housing, in addition to elements necessary for displaying the time of day, an antenna (60) comprising at least one coil winding and being capable of capturing an electromagnetic field bearing radio diffused messages;

a microreceiver (71) capable of receiving and transforming messages captured by said antenna (60) into data perceptible to the wearer of the timepiece; and, non-conductive support structure (70) onto which said microreceiver (71) is at least partially mounted, wherein said support structure (70) bears conductive paths (63,64,65,66) to enable the connection of said antenna (60) to said microreceiver (70) and said at least one coil winding is composed of a plurality of segments (61,62) each being directly connected to said conductive paths (63,64,65,66) such that said antenna (60) is directly mounted to and supported by said support structure (70), at least one segment of said plurality of segments being mounted to said support structure only at two end portions of such at least one segment and having a substantially rigid, self-supporting and free-standing portion intermediate said end portions, when mounted to said support structure.

2. Timepiece according to claim 1, wherein said at least one coil winding comprises first and second winding segments (61,62) each including a freestanding beam (72,73) and two support members (74,75,76,77).

3. Timepiece according to claim 2 wherein said support members of said first and second segments (101,102) project from said support structure (70) in substantially the same direction.

4. Timepiece according to claim 2, wherein the two support members of said first segment (61) project from said support structure (70) in substantially a first direction, and the two support members of said second segment (62) project from said support structure (70) in an opposing direction.

* * * * *